United States Patent [19]
Yamamoto

[11] Patent Number: 5,930,533
[45] Date of Patent: Jul. 27, 1999

[54] CAMERA PROVIDED WITH FOCUS DETECTING DEVICE

[75] Inventor: Yuji Yamamoto, Kasukabe, Japan

[73] Assignee: Canon Kabushiki Kaisha, Tokyo, Japan

[21] Appl. No.: 08/988,352

[22] Filed: Dec. 10, 1997

[30]     Foreign Application Priority Data

Dec. 11, 1996  [JP]  Japan ................................. 8-346495

[51] Int. Cl.⁶ .................................................. G03B 3/10
[52] U.S. Cl. ............................ 396/121; 396/51; 396/123
[58] Field of Search ............................ 396/51, 121, 122, 396/123

[56]            References Cited

U.S. PATENT DOCUMENTS

| | | | |
|---|---|---|---|
| 4,827,303 | 5/1989 | Tsuboi | 396/123 |
| 5,189,460 | 2/1993 | Hayakawa | 396/123 |
| 5,343,246 | 8/1994 | Arai et al. | 396/121 |
| 5,353,089 | 10/1994 | Yaji | 396/123 |
| 5,396,336 | 3/1995 | Yoshii et al. | 396/121 |
| 5,418,595 | 5/1995 | Iwasaki et al. | 396/121 |
| 5,440,369 | 8/1995 | Tabata et al. | 396/122 |
| 5,455,654 | 10/1995 | Suzuki | 354/402 |
| 5,473,403 | 12/1995 | Suda et al. | 354/409 |
| 5,532,783 | 7/1996 | Kusaka | 354/402 |
| 5,659,814 | 8/1997 | Matsukawa et al. | 396/121 |
| 5,692,222 | 11/1997 | Yamada et al. | 396/51 |
| 5,749,000 | 5/1998 | Narisawa | 396/121 |

FOREIGN PATENT DOCUMENTS

| | | |
|---|---|---|
| 0 667 546 A2 | 8/1995 | European Pat. Off. . |
| 0 720 360 A1 | 7/1996 | European Pat. Off. . |

OTHER PUBLICATIONS

Patent Abstracts of Japan, vol. 008, No. 075, Apr. 1984 for No. 58–219505 filed Dec. 1983.

Patent Abstracts of Japan, vol. 018, No. 455, Aug. 1994 for No. 06–141225 filed May 1994.

Patent Abstracts of Japan, vol. 097, No. 002, Feb. 1997 for No. 8–262319 filed Oct. 1996.

*Primary Examiner*—Russell Adams
*Attorney, Agent, or Firm*—Fitzpatrick, Cella, Harper & Scinto

[57]            ABSTRACT

The present invention provides a camera having a focus detecting device for independently detecting each of focus conditions in plural regions of a screen by use of an area sensor. More particularly, the invention provides a camera having a focus detecting device provided with a first mode for setting a first number as a number of focus detection areas and a second mode for setting a second number, smaller than the first number, of areas except for predetermined areas in the focus detection areas in the first mode, as focus detection areas, and arranged to allow selection of the first and second modes, thereby permitting a changeover of the number of focus detection areas according to a photographer's will.

12 Claims, 15 Drawing Sheets

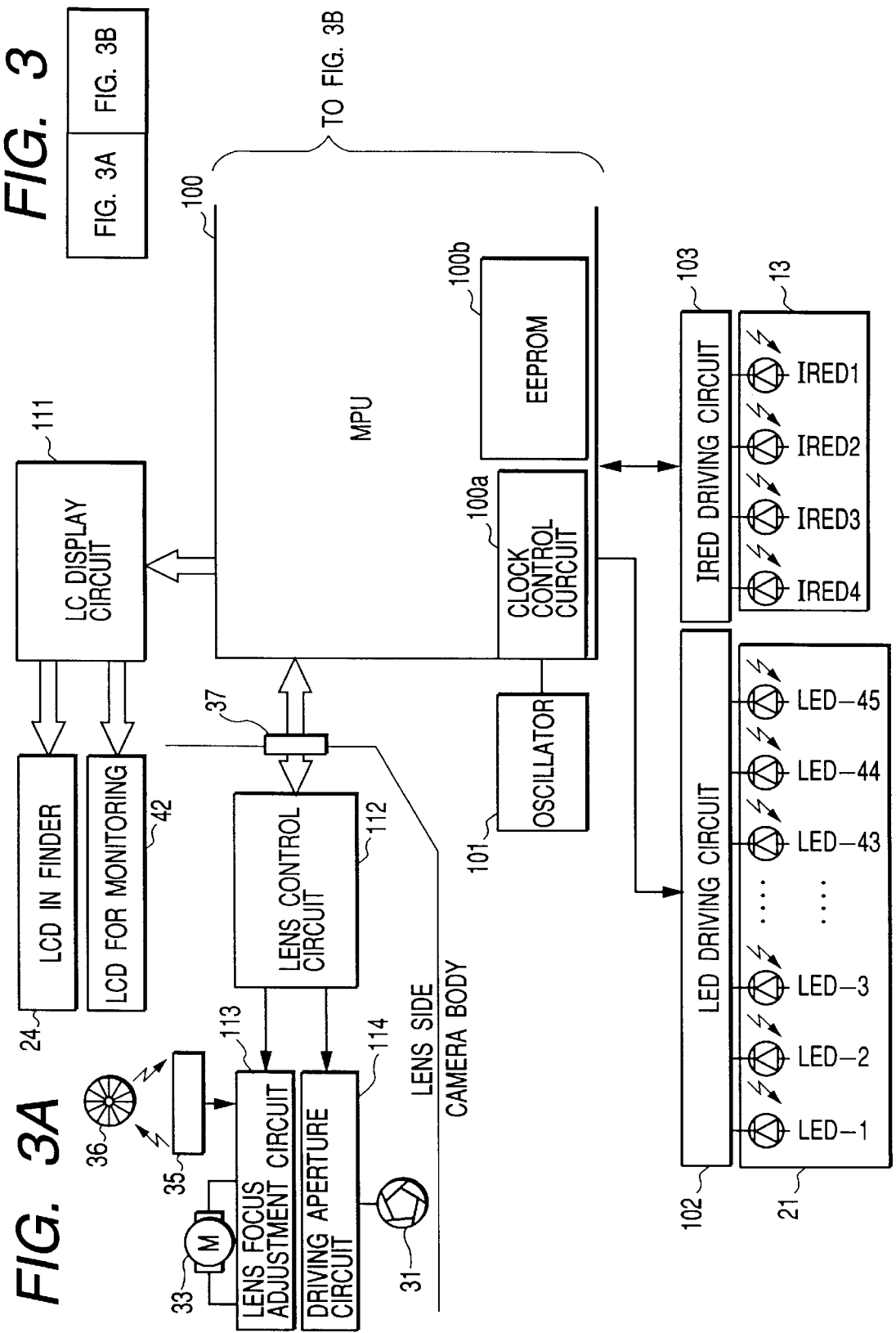

CAMERA PROVIDED WITH FOCUS DETECTING DEVICE

BACKGROUND OF THE INVENTION

1. Field of the Invention

The present invention relates to improvements in a focus detecting device having a plurality of focus detecting points and arranged to detect the focus by use of some or all of the focus detecting points, an automatic focus adjusting apparatus provided with the focus detecting device, and a camera provided with the automatic focus adjusting apparatus.

2. Related Background Art

Cameras having plural focus detecting points in the photographic screen are hitherto known. In the cameras of this type, generally, information at each of the focus detecting points is evaluated according to a predetermined algorithm and the status of focus is detected based thereon.

However, if there were too many focus detecting points for detection of focus, the detection of focus took too much time and focusing could be unsuccessful with an object moving.

There were some cameras having a mode for allowing selection of an arbitrary distance-measuring point out of the plurality of focus detecting points, but they had the problem that the selecting operation became rather difficult with too many focus detecting points.

SUMMARY OF THE INVENTION

A first object of the present invention is to provide a focus detecting device, an automatic focus adjusting apparatus, and a camera that require shorter detection time than that in the case of focus detection using all the focus detecting points and shorter operation time for calculation of focus information and that are readily adaptable to a focus detection target of a moving object.

A second object of the present invention is to provide a focus detecting device, an automatic focus adjusting apparatus, and a camera that are arranged so that even with decrease in the number of focus detecting points, the device can readily capture a focus detection target having been tracked before the decrease.

A third object of the present invention is to provide a focus detecting device, an automatic focus adjusting apparatus, and a camera that are arranged to permit a user to set an arbitrary focus detecting point next from the center focus detecting point, thereby improving operability of an arbitrary focus detecting point.

For achieving the above first object, one aspect of the application is a focus detecting device, an automatic focus adjusting apparatus, and a camera wherein the device has a first mode for setting of a first number for a plurality of focus detecting points for detection of focus and a second mode for setting of a second number of focus detecting points by thinning the focus detecting points in the first mode and wherein in the second mode detection of focus is carried out only in the second number of focus detecting points after the thinning.

For achieving the above second object, one aspect of the application is a focus detecting device, an automatic focus adjusting apparatus, and a camera wherein the device has a first mode for setting of a first number for a plurality of focus detecting points for detection of focus and a second mode for setting of a second number of focus detecting points by decreasing the number from the focus detecting points in the first mode and wherein when an arbitrary focus detecting point is specified in the first mode and thereafter the mode is changed to the second mode, a focus detecting point positionally close to the focus detecting point specified in the first mode is newly set out of the focus detecting points in the second mode and detection of focus is carried out with this focus detecting point.

For achieving the above third object, one aspect of the application is a focus detecting device, an automatic focus adjusting apparatus, and a camera wherein the device has a first mode for setting of a first number for a plurality of focus detecting points for detection of focus and a second mode for setting a second number of focus detecting points by decreasing the number from the focus detecting points in the first mode and wherein when an arbitrary focus detecting point is specified in the first mode and thereafter the mode is changed to the second mode, a specific focus detecting point is set as a focus detecting point in the second mode.

The other objects of the present invention will become more apparent from the embodiments described below with the drawings.

DESCRIPTION OF THE PREFERRED EMBODIMENTS

The present invention will be described in detail based on the embodiments illustrated.

Figure 1:
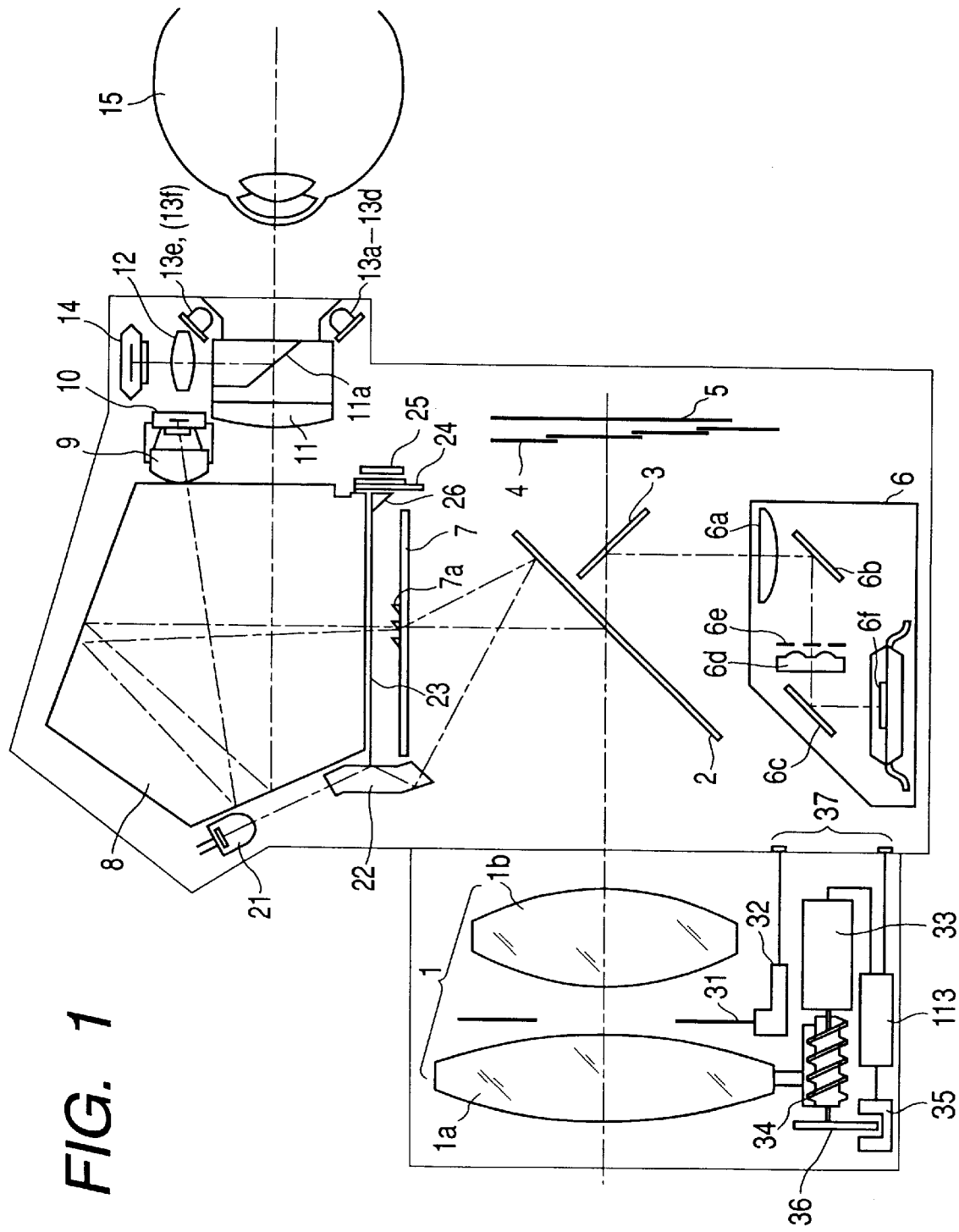
FIG. 1 is a drawing to show an optical arrangement of a single-lens reflex camera according to the first embodiment of the present invention.

FIG. 1 is a drawing to show the optical arrangement of a single-lens reflex camera provided with a line-of-sight detecting device according to the first embodiment of the present invention.

In FIG. 1, reference numeral 1 designates a taking lens, which is represented by two lenses 1a, 1b for convenience's sake, but which is actually composed of many lenses. Numeral 2 denotes a main mirror, which is obliquely set in or is retracted from the photographing optical path, depending upon observation conditions and photographing conditions. Numeral 3 represents a sub-mirror, which reflects light transmitted by the main mirror 2 toward the bottom of the camera body. Numeral 4 stands for a shutter. Numeral 5 denotes a photosensitive member, which is a silver-salt film, a solid state imaging device of the CCD type, the MOS type, or the like, or a camera tube such as a vidicon.

Figure 2:
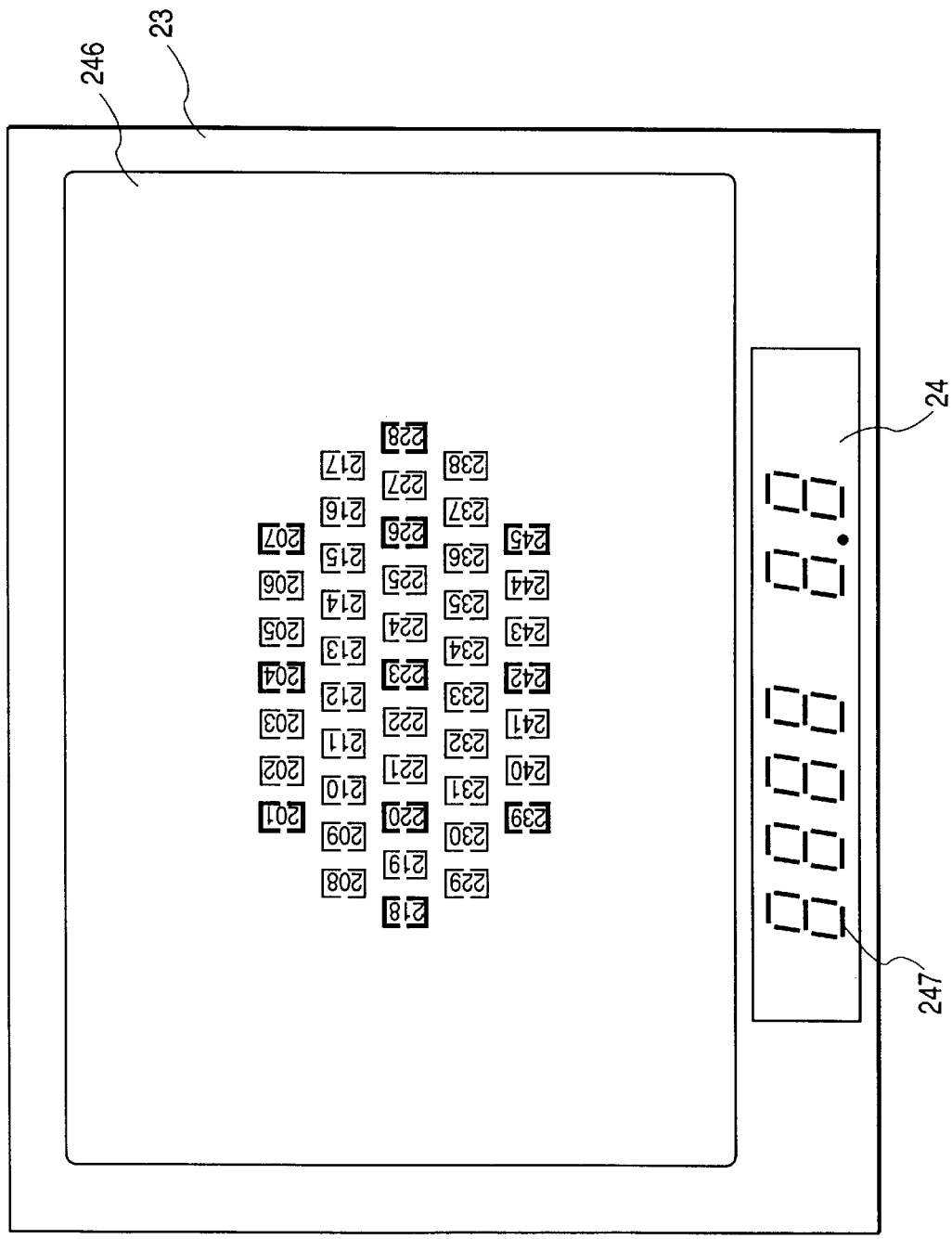
FIG. 2 is a drawing to show a finder field that can be observed in the finder of the camera of FIG. 1.

Numeral 6 indicates a focus detecting device, which is a device of the known phase difference detecting method mainly composed of field lens 6a located near the image plane, reflecting mirrors 6b and 6c, secondary imaging lens 6d, aperture stop 6e, and area sensor 6f consisting of plural CCDs or the like. This focus detecting device 6 is so constructed as to be capable of detecting the focus in multiple zones in observation screen 246, as shown in FIG. 2.

Numeral 7 designates a focusing screen located on an intended image plane of the taking lens 1, 8 a pentagonal prism for changing the finder optical path, and 9, 10 an imaging lens and a photometry sensor for measuring the luminance of object in the observation screen. The imaging lens 9 keeps the focusing screen 7 and photometry sensor 10 in the conjugate relation with each other through the reflection optical path in the pentagonal roof prism 8.

Numeral 11 denotes an eyepiece lens located behind the exit plane of pentagonal roof prism 8, which has a beam splitter 11a and which is used for permitting photographer's eye 15 to observe the focusing screen 7. The beam splitter 11a is, for example, a dichroic mirror for transmitting the visible light and reflecting the infrared light. Numeral 12 represents a light receiving lens and 14 an area sensor consisting of a two-dimensional array of photoelectric conversion elements, which is located so as to be conjugate with the vicinity of the iris of the photographer's eye 15 located at a predetermined position, with respect to the light receiving lens 12. Further, 13a to 13d indicate infrared light emitting diodes (hereinafter referred to as IREDs), which are illumination light sources for illuminating the photographer's eye 15.

Numeral 21 denotes high-intensity LEDs for superimposition that can be visually recognized even in a bright object. Light emitted from the superimposition LED 21 is reflected by light-projecting prism 22 and the main mirror 2, then is bent into the vertical direction by small prism array 7a provided in the display section of focusing screen 7, and travels through the eyepiece lens 11 to reach the photographer's eye 15. Thus, this small prism array 7a is arranged so that each prism is formed in a frame shape at a position corresponding to a focus detecting point in the focusing screen 7 and each prism is illuminated by a superimposition LED 21 corresponding thereto (each of which will be denoted by LED-1, LED-2, . . . , LED-44, or LED-45).

FIG. 2 shows the finder field that can be observed when the observer looks into the finder.

Each focus detecting point 201, 202, . . . , 244, 245 lights in the finder field 246 to indicate a focus detecting point (which will be referred as a distance-measuring point in the following description, because the embodiment is adaptable for distance-measuring points for obtaining distance information to an object) (this indication will be called superimpose indication). Thick frames out of the distance-measuring point marks indicate distance-measuring points displayed when the number of distance-measuring points is limited to 11 by thinning.

Numeral 23 common to FIG. 1 and FIG. 2 represents a field mask for forming the finder field region. Numeral 24 is an in-finder LCD for displaying photographing information outside the finder field, which is illuminated by LED (F-LED) 25 for illumination shown in FIG. 1. Light transmitted by the in-finder LCD 24 is guided into the finder by triangular prism 26 to be displayed in a region 247 outside the finder field in FIG. 2, and the photographer thus observes the photographing information.

Returning to FIG. 1, numeral 31 designates an aperture stop provided in the taking lens 1, 32 an aperture driving device including an aperture driving circuit 114, 33 a motor for driving the lens, and 34 a lens driving member composed of a driving gear and other elements. Numeral 35 stands for a photocoupler, which detects rotation of pulse plate 36 synchronous with the lens driving member 34 and transfers the detection result to a lens focus adjustment circuit described below. Numeral 113 indicates the lens focus adjustment circuit, which drives the lens driving motor 33 by a predetermined amount based on the information from the photocoupler 35 and information about a lens drive amount from the camera side, thereby moving the focusing lens 1a of the taking lens 1 to the in-focus position. Numeral 37 denotes mount contacts being a well-known interface between the camera and the lens.

Figure 3B:
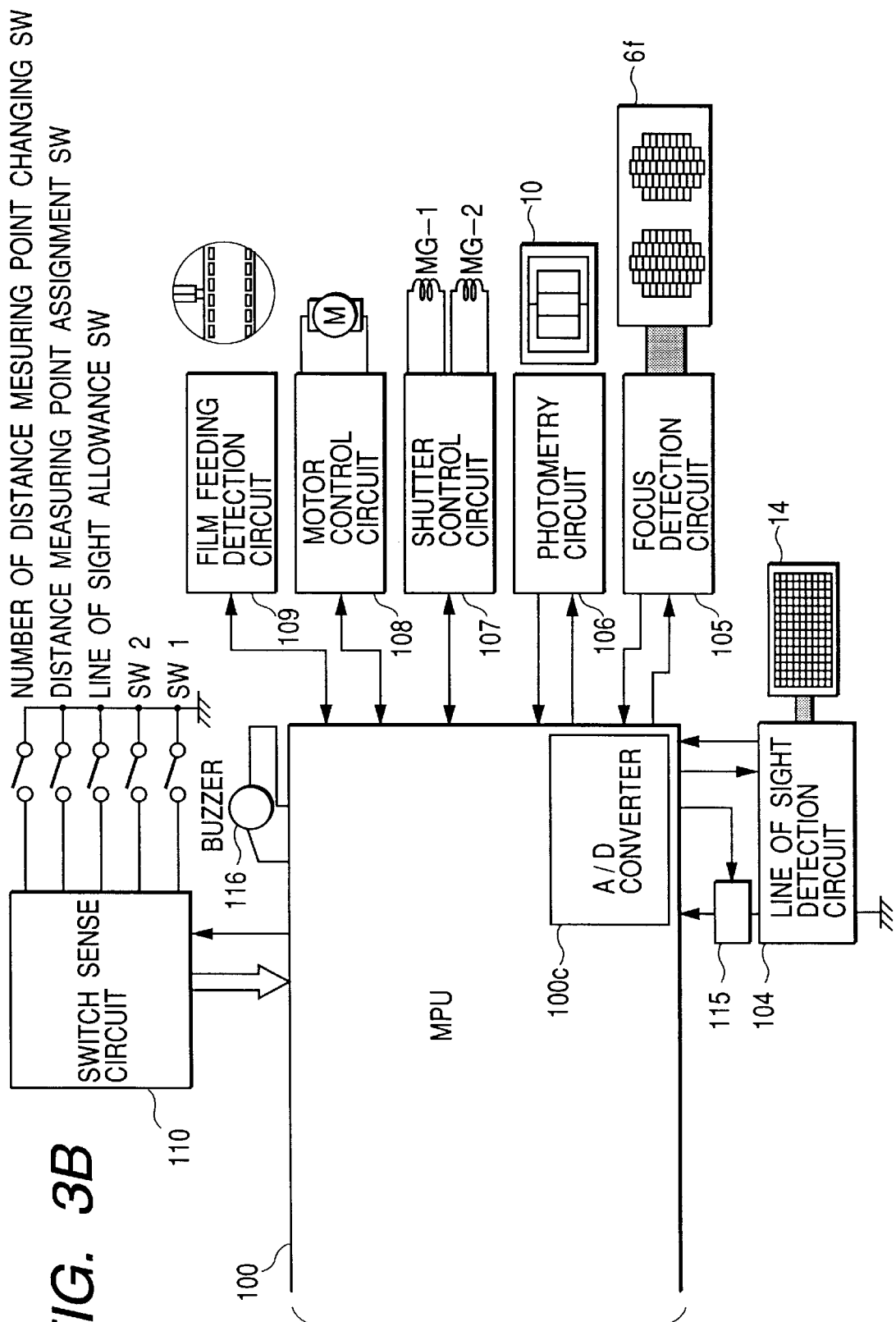
FIG. 3 comprised of FIGS. 3A and 3B is a block diagram to show the main part of an electrical configuration built in the camera of FIG. 1.
Figure 4:
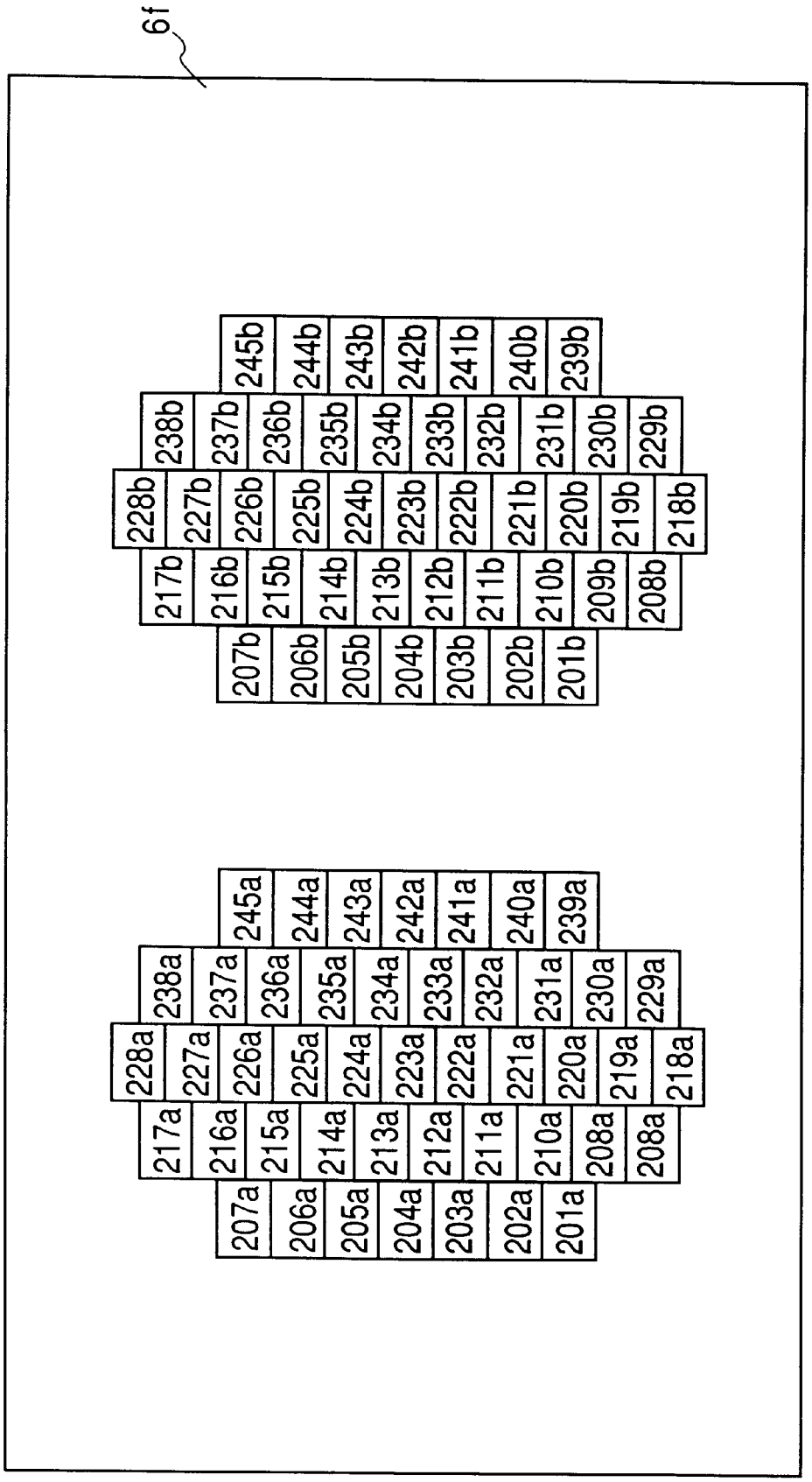
FIG. 4 is a drawing to show a finder field that can be observed in the finder of the camera of FIG. 1.

FIGS. 3A and 3B are block diagrams to show the main part of the electrical configuration built in the single-lens reflex camera of the above structure, wherein the same symbols denote the same elements as those in FIG. 1.

In FIGS. 3A and 3B, numeral 100 designates a central processing unit of a microcomputer (hereinafter referred to as MPU) being a camera controlling means built in the camera body, which performs internal operations based on the clock created by oscillator 101. Numeral 100a indicates a clock control circuit, which determines the operation frequency of the MPU 100 by not dividing the original oscillation frequency created by the oscillator 101 or by dividing it at the pitch of a half, one sixteenth, or the like by a signal in the MPU 100. Numeral 100b is an EEPROM being a storage means, which can store the photographing information including a film counter and the other information. Numeral 100c represents an A/D converter, which undergoes A/D conversion of an analog signal supplied from line-of-sight detection circuit 104, focus detection circuit 105, or photometry circuit 106 having multisegment photometry sensors, as described hereinafter.

Connected to the MPU 100 are LED driving circuit 102, IRED driving circuit 103, line-of-sight detection circuit 104, focus detection circuit 105, photometry circuit 106, shutter control circuit 107, motor control circuit 108, film feeding detection circuit 109, switch sense circuit 110, and liquid-crystal display circuit 111. Transmission of signal is made through the mount contacts 37 shown in FIG. 1 from and to the lens control circuit 112 positioned in the taking lens 1.

The LED driving circuit 102 turns the superimposition LEDs 21 on according to signals from the MPU 100. The IRED driving circuit 103 turns the IREDs 13 on according to signals from the MPU 100.

The line-of-sight detection circuit 104 carries out storage operation and reading operation of the area sensor 14 according to signals from the MPU 100 and sends a pixel output analog signal of each pixel to the MPU 100. The MPU 100 converts each such analog signal to a digital signal by the A/D converter 100c, extracts, based on each pixel information, characteristic points of an eyeball image necessary for detection of line of sight according to predetermined algorithm, as described hereinafter, and calculates an angle of rotation of the photographer's eyeball from positions of the respective characteristic points.

In the single-lens reflex camera according to the present embodiment, when a line-of-sight allowance switch is on, the line of sight (a point of fixation) of the photographer on the finder is operationally extracted, thereby selecting one of plural distance-measuring points 201 to 245, and automatic focus detection is carried out around the distance-measuring point thus selected. However, when a distance-measuring point assignment switch is on, the selection of distance-measuring point based on the detection of line of sight is not carried out, because the position of a distance-measuring point is fixed by the photographer.

Numeral 115 is a regulator for supplying the power to the line-of-sight detection circuit 104 in response to a signal from the MPU 100, which is so controlled as to supply the power only upon execution of the line-of-sight detection operation.

The area sensor 6f is an area sensor composed of forty five sets of CCDs or the like corresponding to the plural distance-measuring points 201 to 245 in the screen, as described previously. Describing in detail, as shown in FIG. 4, 201a to 245a and 201b to 245b each correspond to the distance-measuring points. The focus detection circuit 105 carries out the storage control and reading control of the area sensor 6f according to signals from the MPU 100 to output each pixel information to the MPU 100. The MPU 100 executes A/D conversion of this information, performs the focus detection based on the known phase difference detecting method, and sends the focus detection information detected to the lens control circuit 112 to make focus adjustment of lens be performed.

The photometry circuit 106 outputs an output from the photometry sensor 10, as a luminance signal of each area in the screen, to the MPU 100. The shutter control circuit 107 moves a shutter leading curtain (through magnet MG-1) and a shutter trailing curtain (through magnet MG-2) according to signals from the MPU 100, thus performing the exposure operation. The motor control circuit 108 controls the motor according to signals from the MPU 100, thereby carrying out up and down operations of the main mirror 2, charging of shutter, and feeding of film. The film feeding detection circuit 109 detects whether the film has been wound up by one frame upon feeding of film and sends a signal to the MPU 100.

SW1 is a switch which becomes on by a first stroke of the shutter release button not illustrated and which is for starting photometry, AF, and line-of-sight detection operations. SW2 is a switch which becomes on by a second stroke of the shutter release button not illustrated and which is for starting the exposure operation. The switch sense circuit 110 detects status signals of these switches SW1, SW2, and the number-of-distance-measuring-points changing switch, distance-measuring point assignment switch, and line-of-sight allowance switch shown in FIG. 3, and other unrepresented control members of camera and sends them to the MPU 100.

The liquid-crystal display circuit 111 controls displays of the in-finder LCD 24 and LCD 42 for an unrepresented monitor according to signals from the MPU 100. The lens control circuit 112 performs communication with the MPU 100 through the lens mount contacts 37 and actuates the lens focus adjustment circuit 113 and aperture control circuit 114, thereby controlling the focus adjustment of lens and the aperture.

The operation of the single-lens reflex camera of the above structure will be described below using FIG. 5 and FIG. 6.

Figure 5:
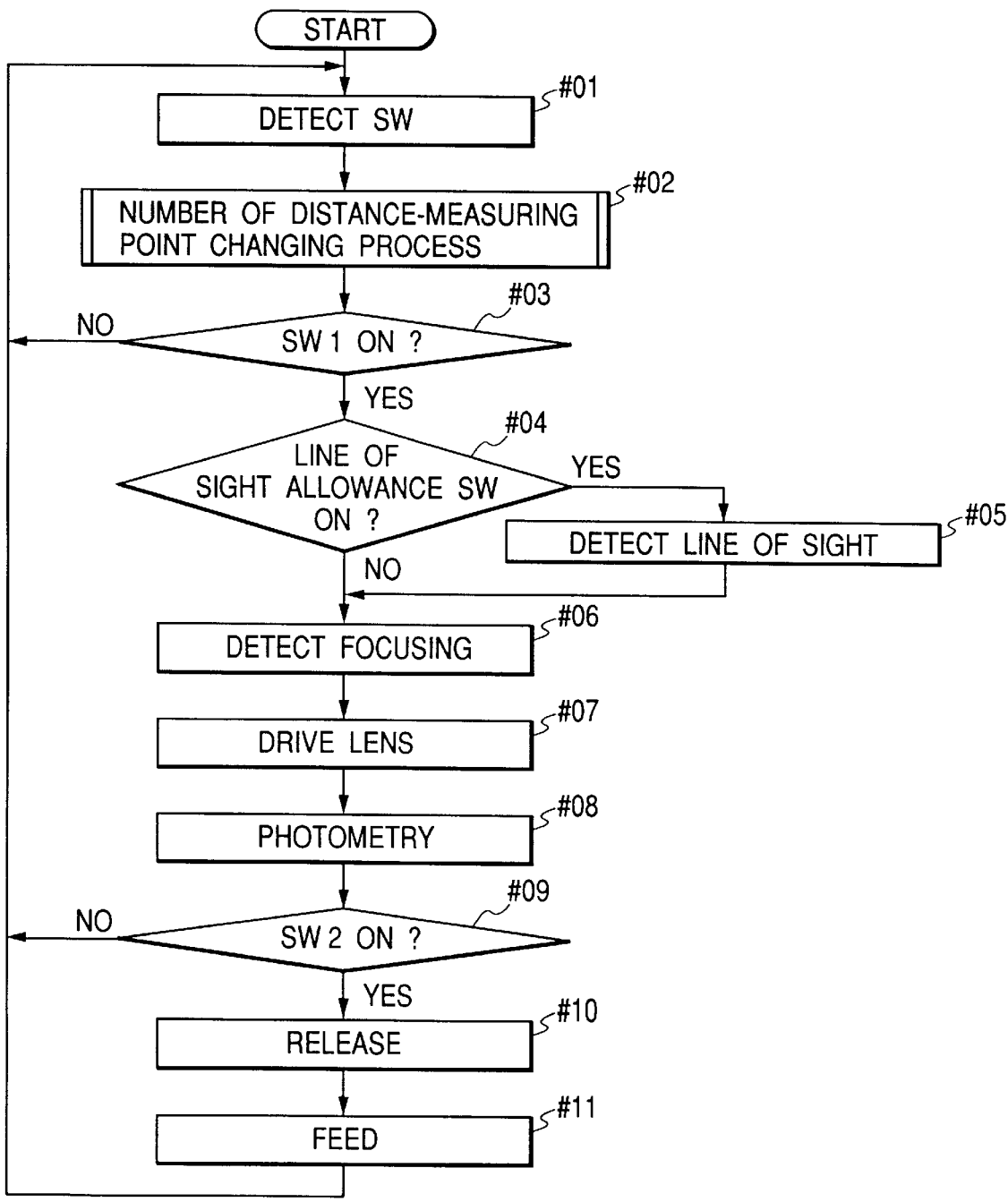
FIG. 5 is a flowchart to show a series of operations of the camera of FIG. 1.
Figure 6:
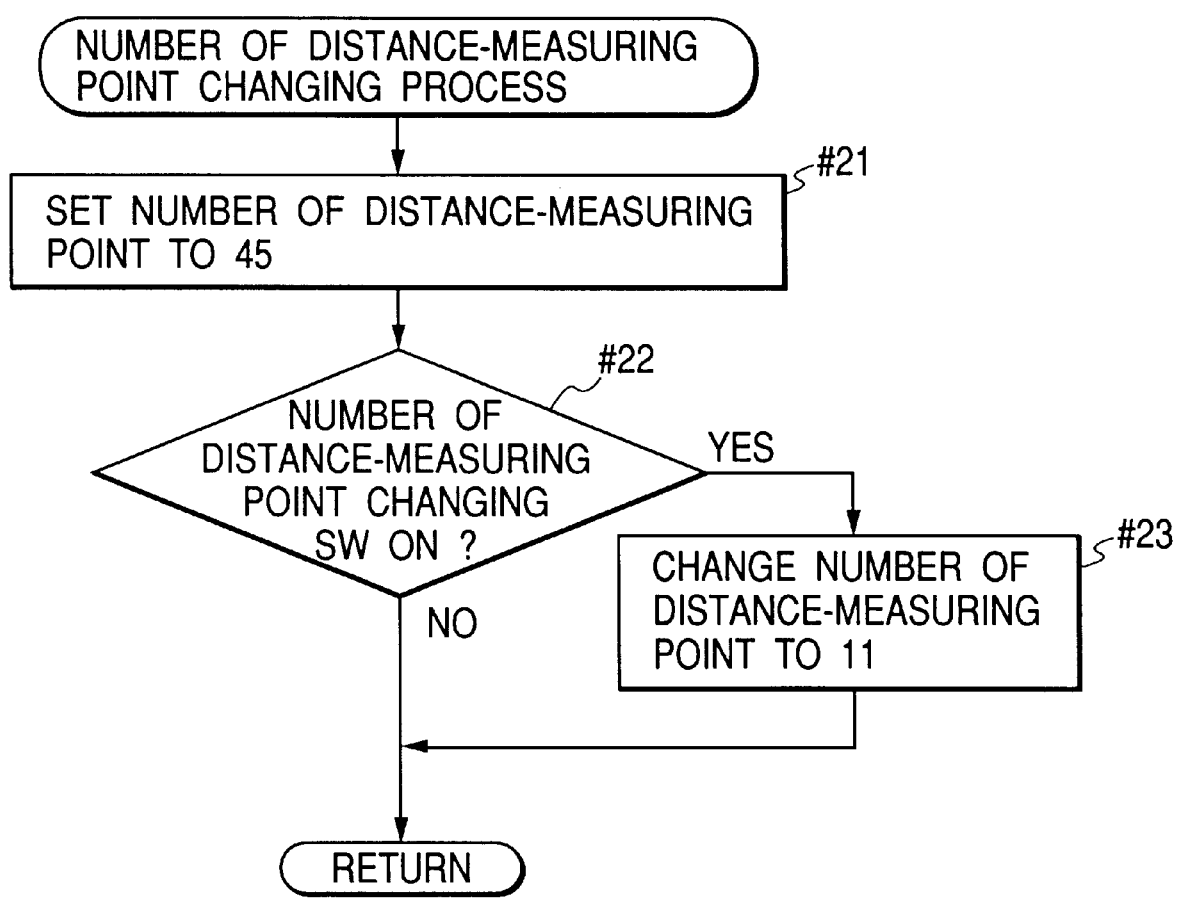
FIG. 6 is a flowchart to show operations in a changing process of number of distance-measuring points carried out in step #02 of FIG. 5.

In FIG. 5, when the operation of the camera is started, the MPU 100 first performs detection of the switches in step #01 to obtain status information of the various switches. Then it executes the subroutine of "number-of-distance-measuring-points changing process" in next step #02.

The "number-of-distance-measuring-points changing process," which is the subroutine carried out in above step #02, will be described here referring to the flowchart of FIG. 6.

In step #21 the number of distance-measuring points used for the detection of focus is set to 45 (201 to 245 shown in FIG. 2). In next step #22, the status of the number-of-distance-measuring-points changing switch is checked. If it is off then the flow will leave this subroutine to return to the main routine. On the other hand, if the number-of-distance-measuring-points changing switch is on then the flow will go to step #23 to decrease the distance-measuring points used for the detection of focus to 11 points (201, 204, 207, 218, 220, 223, 226, 228, 239, 242, and 245 in the thick frames of FIG. 2) by thinning and then leave this subroutine to return to the main routine.

Returning to FIG. 5, in step #03 the MPU 100 checks the status of the switch SW1, which becomes on by the first stroke of the shutter release button; if it is off the flow will return to step #01. If the switch SW1 is on then the flow will proceed to step #04 to check the status of the line-of-sight allowance switch this time; if it is off then the flow will proceed immediately to step #06. If the line-of-sight allowance switch is on then the flow will branch off to step #05 to carry out the detection of line of sight here. In step #05 the line of sight (point of fixation) is obtained by detecting the P images (Purkinje images: corneal reflex images) and a position of the center of the pupillary circle, and a distance-measuring point corresponding to the point of fixation obtained is selected out of the distance-measuring points set in above step #02. Then the flow goes to step #06.

In step #06, if the line-of-sight allowance switch is on then the focus detection operation will be carried out at the distance-measuring point selected in above step #05. If the line-of-sight allowance switch is off the focus detection operation will be carried out at the plural distance-measuring points set in above step #02. This focus detection is carried out by the known phase difference detecting method by the focus detection circuit 105 as described previously.

In next step #07 the MPU 100 controls the lens control circuit 112 according to the focus information obtained by the above focus detection operation, thereby performing the focus adjustment of the lens. In subsequent step #08 an exposure dose is determined based on the luminance information of object from the photometry circuit 106. In step #09 the status of the switch SW2, which becomes on by the second stroke of the shutter release button, is then checked; if it is off the flow will return to step #01.

On the other hand, if the switch SW2 is on then the flow will proceed from step #09 to step #10 to perform the following release control for exposure on the film. Specifically, the main mirror 2 is moved up prior to the exposure operation, so as to be retracted from the photographing optical path. Then the aperture 31 in the lens is driven through the lens control circuit 112 up to an aperture amount based on the exposure dose determined. Then the shutter is controlled by the shutter control circuit 107 so as to be open during a shutter open time (shutter speed) based on the exposure dose determined, thereby completing exposure. After that, the main mirror 2 retracted from the photographing optical path is moved down so as to be again obliquely set in the photographing optical path.

In next step #11, the MPU 100 starts feeding of film through the motor control circuit 108 in order to wind the film up by one frame and stops the feeding when receiving a film feed completion signal from the film feeding detection circuit 109. Then the flow returns to step #01.

According to the first embodiment described above, when there are plural distance-measuring points, the focus can be detected at some of them by arbitrarily thinning the distance-measuring points. Therefore, the detection time and operation time are shorter than those in the case of distance measurement at all the distance-measuring points. In addition, the device is readily adaptable for a moving object. The thinning of distance-measuring points also improves the operability of selection of distance-measuring point.

Second embodiment

The single-lens reflex camera according to the second embodiment of the present invention will be described below. The optical arrangement and electrical configuration of the camera are the same as in the first embodiment described above and, therefore, the details thereof are omitted herein.

Figure 7:
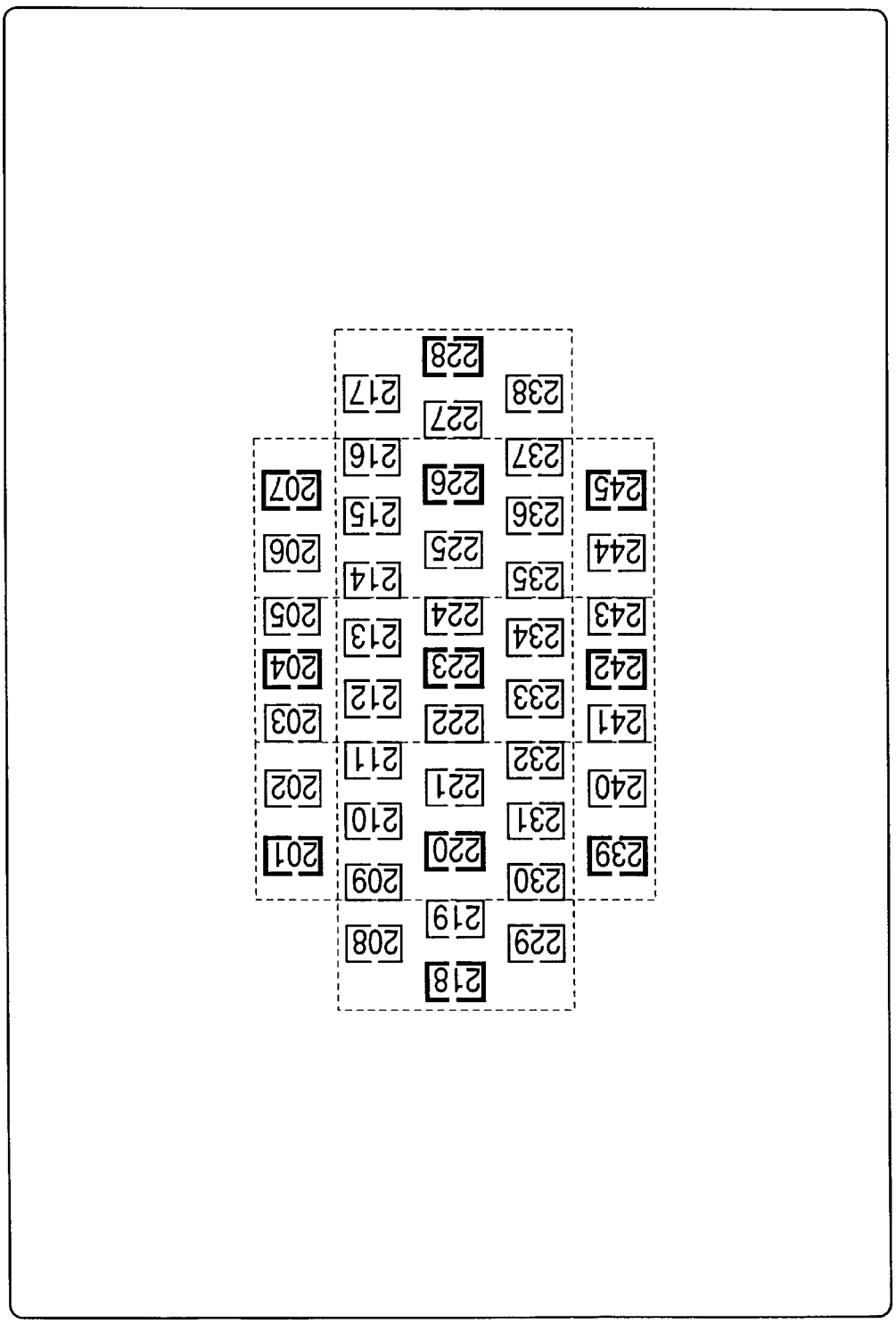
FIG. 7 is a drawing to show a distribution of arbitrary distance-measuring points in a single-lens reflex camera according to the second embodiment of the present invention.
Figure 8A:
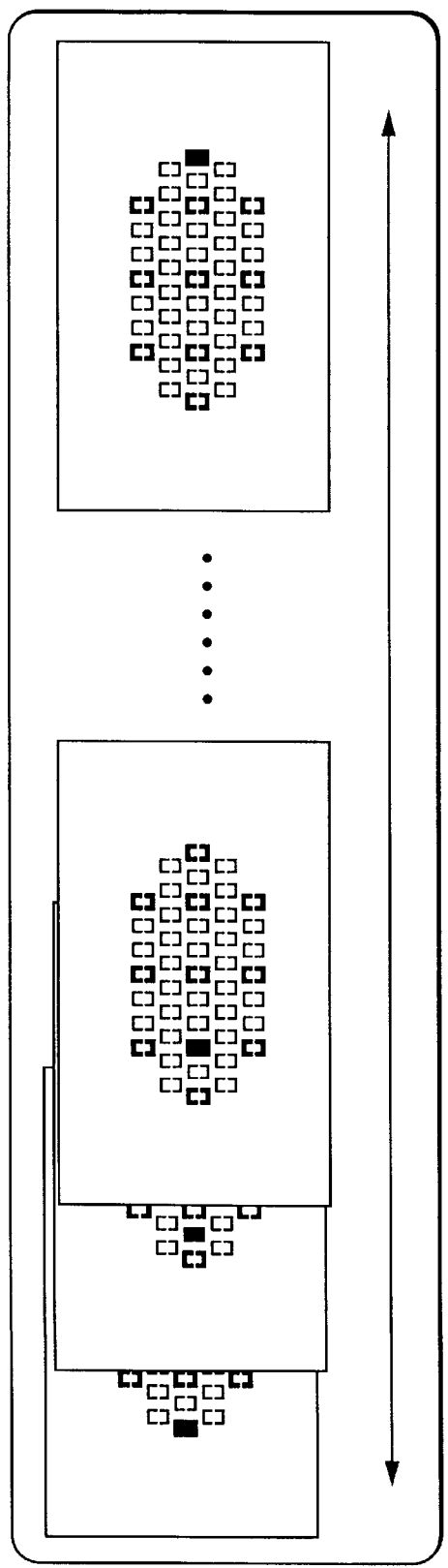
FIGS. 8A and 8B are drawings for explaining movement of distance-measuring point upon arbitrary selection of distance-measuring point in the second embodiment of the present invention.
Figure 8B:
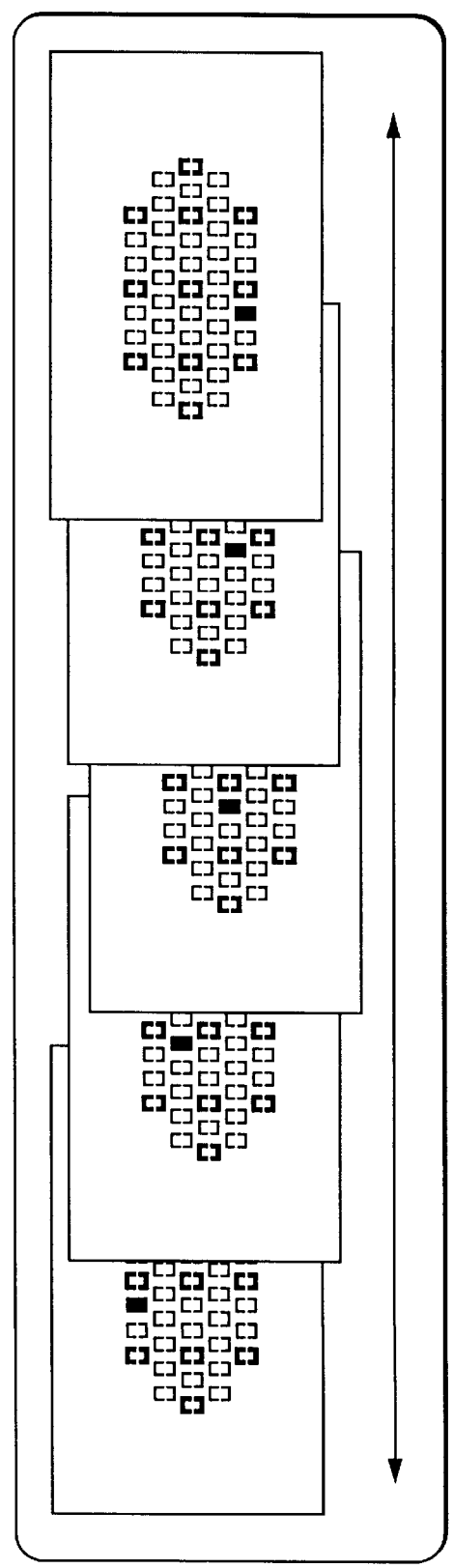
Figure 9A:
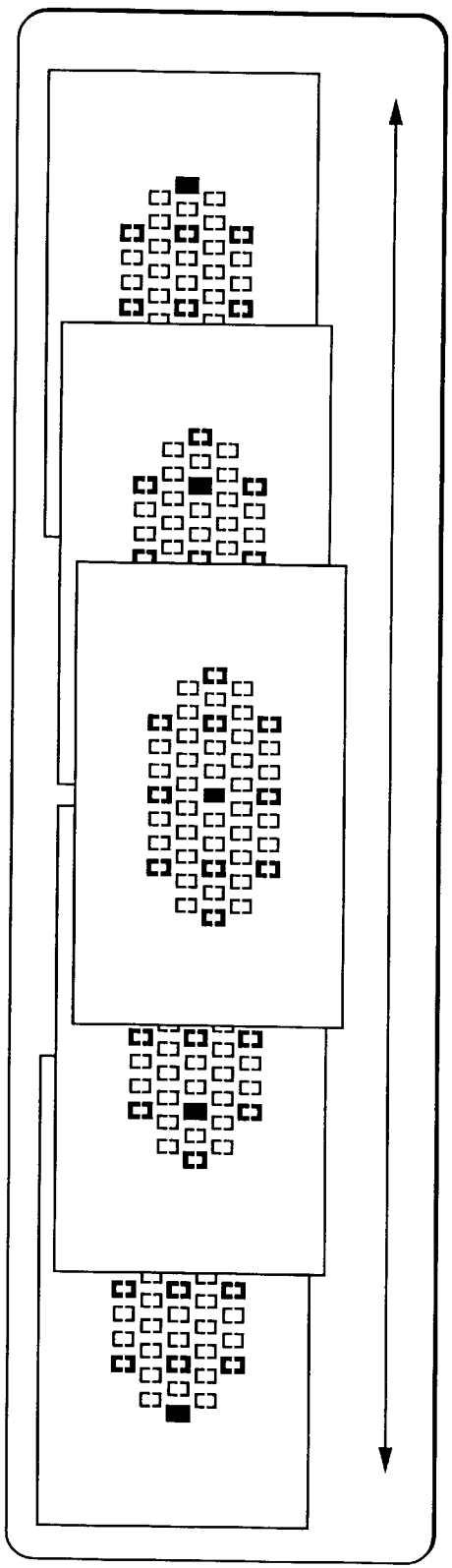
FIGS. 9A and 9B are drawings for also explaining movement of distance-measuring point upon arbitrary selection of distance-measuring point in the second embodiment of the present invention.
Figure 9B:
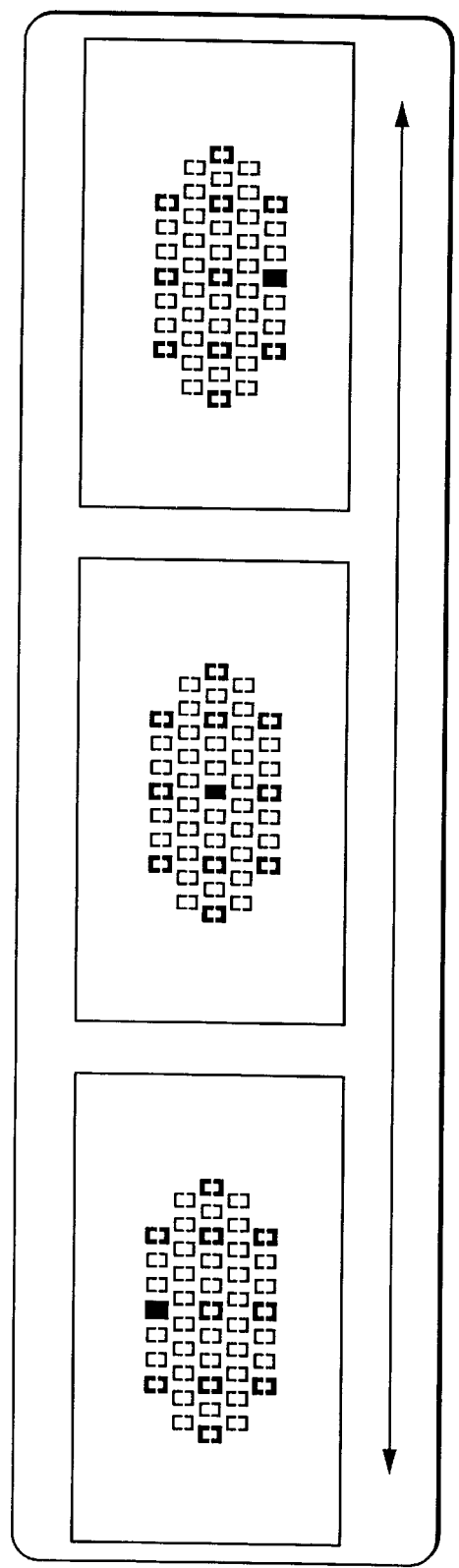

FIG. 7 is a drawing to show a distribution of arbitrary distance-measuring points in the single-lens reflex camera in the second embodiment of the present invention, showing partitioning (portions surrounded by dotted lines) for changing an arbitrarily selected distance-measuring point within eleven points when the distance-measuring points are changed from forty five points to eleven points. FIGS. 8A and 8B and FIGS. 9A and 9B are drawings each for explaining movement of selected distance-measuring point upon arbitrary selection of distance-measuring point from 45 points or from 11 points, respectively, wherein black portions indicate distance-measuring points selected. FIG. 8A shows horizontal movement, wherein movement stops at the left and right extremes. FIG. 8B shows vertical movement, wherein the movement stops at the top and bottom ends. FIG. 9A shows horizontal movement in the eleven distance-measuring points, wherein the movement stops at the left and right extremes and FIG. 9B shows vertical movement in the eleven distance-measuring points, wherein the movement stops at the top and bottom ends.

The sequential operations of the single-lens reflex camera in this embodiment will be described using the flowcharts of FIG. 10 to FIG. 12.

Figure 10:
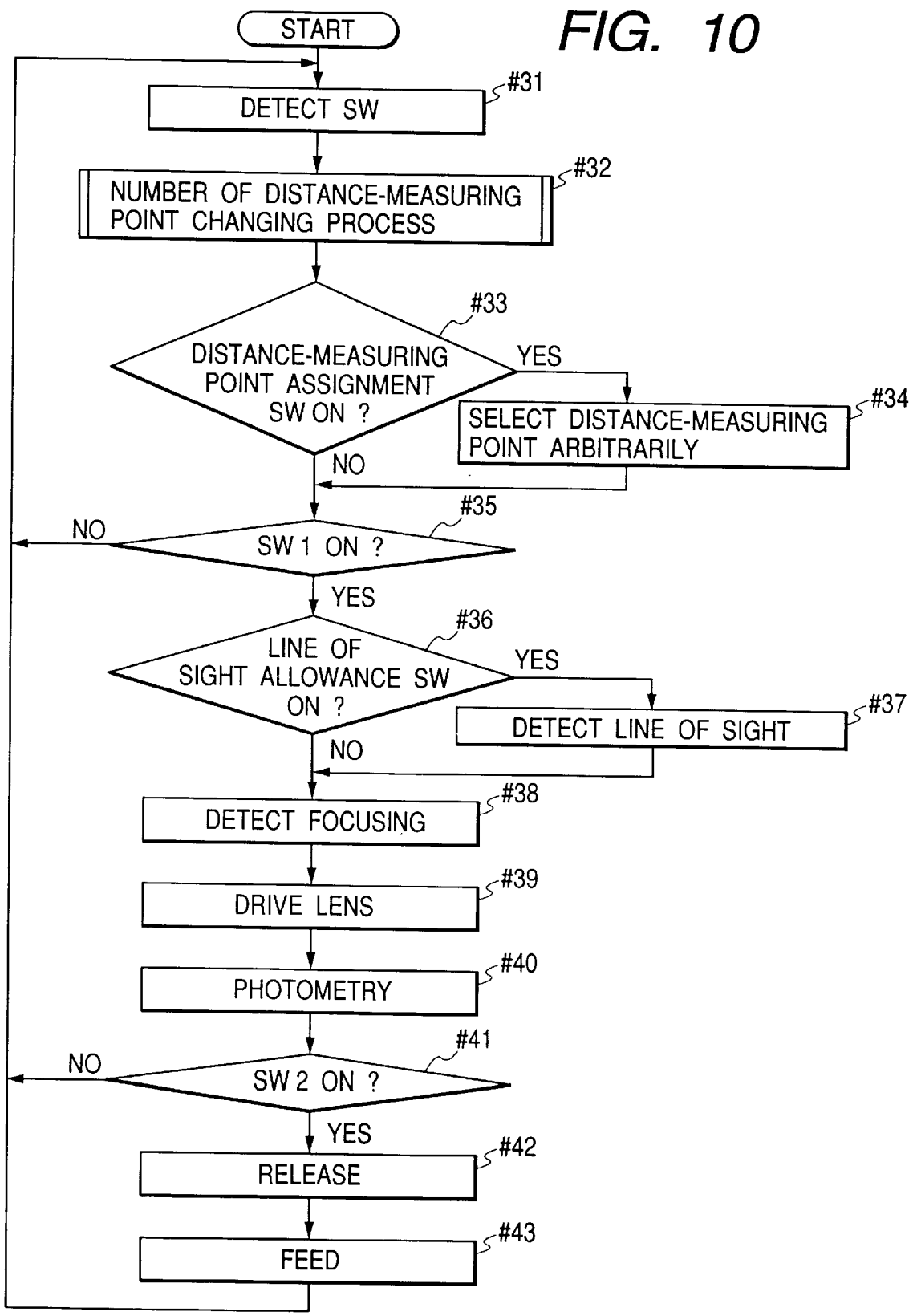
FIG. 10 is a flowchart to show a series of operations in the single-lens reflex camera according to the second embodiment of the present invention.
Figure 11:
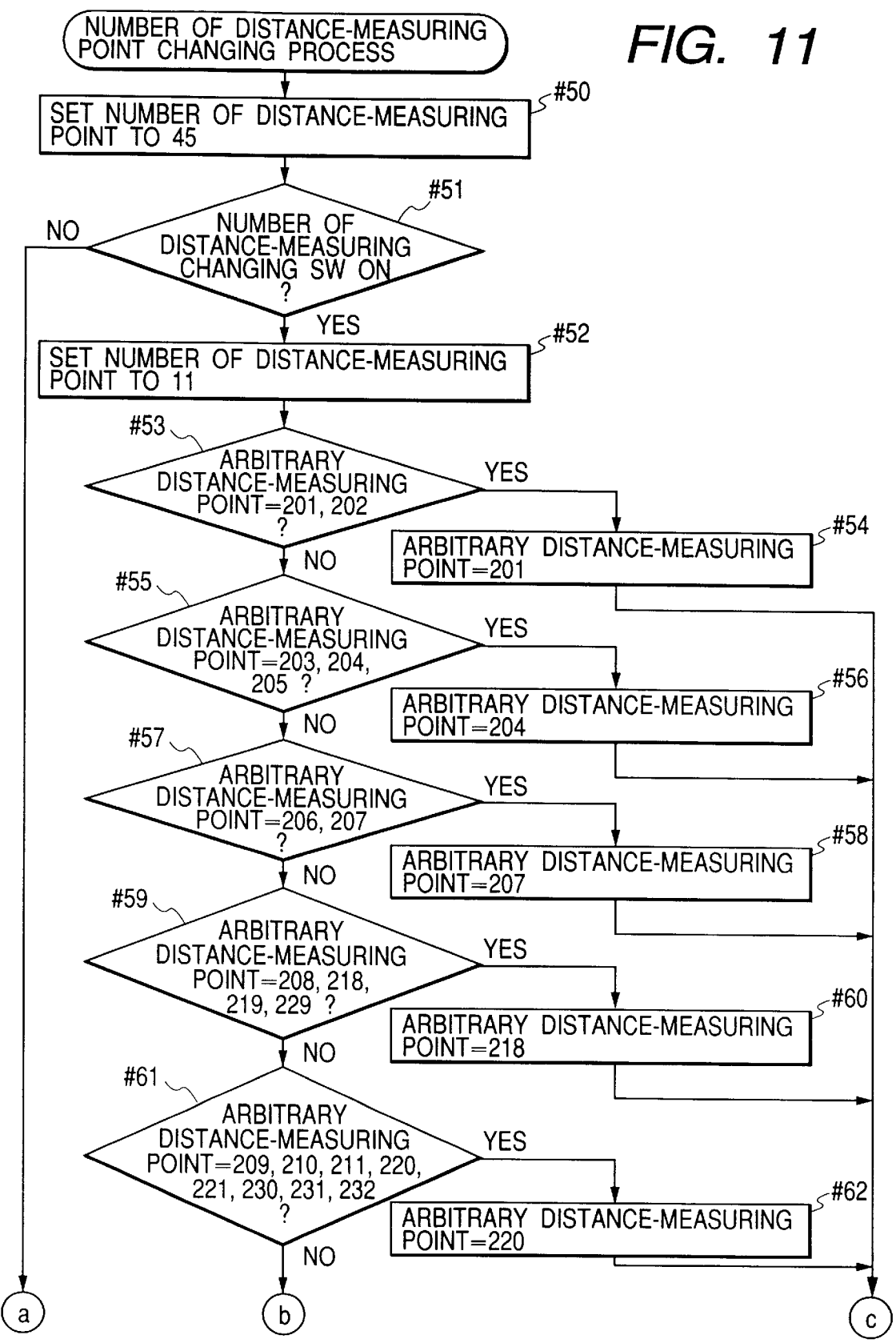
FIG. 11 is a flowchart to show some of operations in a changing process of number of distance-measuring points carried out in step #32 of FIG. 10.

In FIG. 10, when the operation of camera is started, the MPU 100 first executes the switch detection in step #31 and then carries out the subroutine of "number-of-distance-measuring-points changing process" in next step #32.

The "number-of-distance-measuring-points changing process," which is the subroutine executed in above step #32, will be described here using the flowcharts of FIG. 11 and FIG. 12.

In step #50, the number of distance-measuring points available for distance measurement is set to 45. Then, in step #51, the status of the number-of-distance-measuring-points changing switch is checked; if it is off then the flow will leave this subroutine to return to the main routine.

If the number-of-distance-measuring-points changing switch is on then the flow will proceed from step #51 to step #52 to change the number of distance-measuring points available for distance measurement to 11. Then, in step #53, it is checked whether the arbitrary distance-measuring point specified by the photographer is either 201 or 202. If so the flow will branch off to step #54 to set the arbitrary distance-measuring point to 201, and then the flow will leave this subroutine to return to the main routine.

If the arbitrary distance-measuring point determined by the photographer is one other than 201 and 202 the flow will proceed from step #53 to step #55 to check this time whether the arbitrary distance-measuring point specified by the photographer is 203, 204, or 205. If so then the flow will branch off to step #56 to set the arbitrary distance-measuring point to 204 and will leave this subroutine to return to the main routine.

If the arbitrary distance-measuring point specified by the photographer is one other than 203, 204, and 205 the flow will proceed from step #55 to step #57 to check this time whether the arbitrary distance-measuring point specified by the photographer is 206 or 207. If so the flow will branch off to step #58 to set the arbitrary distance-measuring point to 207 and will leave this subroutine to return to the main routine.

If the arbitrary distance-measuring point specified by the photographer is one other than 206 and 207 then the flow will proceed from step #57 to step #59 to check this time whether the arbitrary distance-measuring point is 208, 218, 219, or 229. If so the flow will branch off to step #60 to set the arbitrary distance-measuring point to 218 and will leave this subroutine to return to the main routine.

If the arbitrary distance-measuring point specified by the photographer is one other than 208, 218, 219, and 229 then the flow will proceed from step #59 to step #61 to check this time whether the arbitrary distance-measuring point specified by the photographer is 209, 210, 211, 220, 221, 230, 231, or 232. If so the flow will branch off to step #62 to set the arbitrary distance-measuring point to 220 and will leave this subroutine to return to the main routine.

Figure 12:
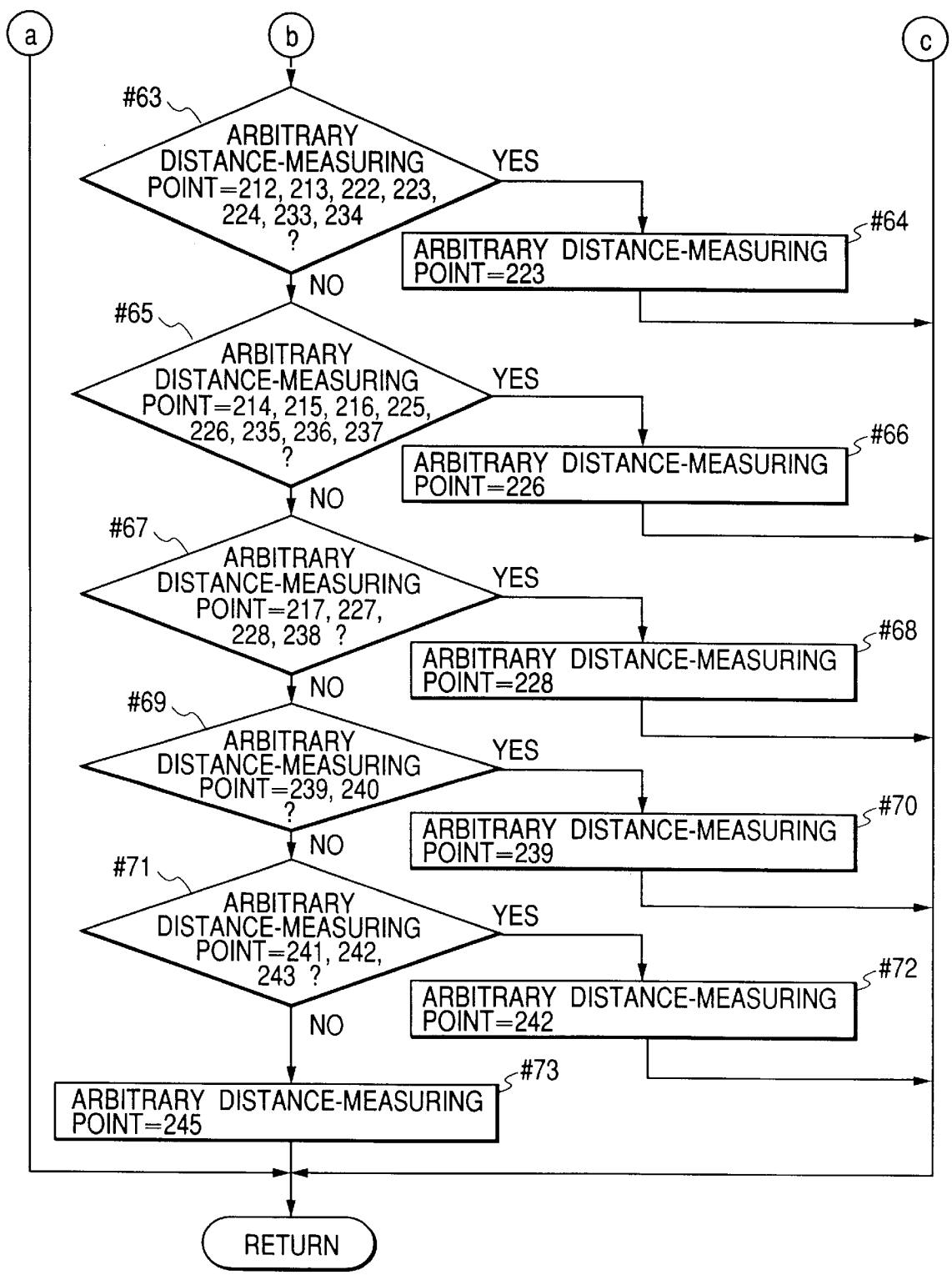
FIG. 12 is a flowchart to show the rest operations following the operations of FIG. 11.

If the arbitrary distance-measuring point specified by the photographer is one other than 209, 210, 211, 220, 221, 230, 231, and 232 the flow will proceed from step #61 to step #63 of FIG. 12 to check this time whether the arbitrary distance-measuring point specified by the photographer is 212, 213, 222, 223, 224, 233, or 234. If so the flow will branch off to step #64 to set the arbitrary distance-measuring point to 223 and will leave this subroutine to return to the main routine.

If the arbitrary distance-measuring point specified by the photographer is one other than 212, 213, 222, 223, 224, 233, or 234 the flow will proceed from step #63 to step #65 to check this time whether the arbitrary distance-measuring point specified by the photographer is 214, 215, 216, 225, 226, 235, 236, or 237. If so the flow will branch off to step #66 to set the arbitrary distance-measuring point to 226 and will leave this subroutine to return to the main routine.

If the arbitrary distance-measuring point specified by the photographer is one other than 214, 215, 216, 225, 226, 235, 236, and 237 the flow will proceed from step #65 to step #67 to check this time whether the arbitrary distance-measuring point specified by the photographer is 217, 227, 228, or 238. If so the flow will branch off to step #68 to set the arbitrary distance-measuring point to 228 and will leave this subroutine to return to the main routine.

If the arbitrary distance-measuring point specified by the photographer is one other than 217, 227, 228, and 238 the flow will proceed from step #67 to step #69 to check this time whether the arbitrary distance-measuring point specified by the photographer is 239 or 240. If so the flow will branch off to step #70 to set the arbitrary distance-measuring point to 239 and will leave this subroutine to return to the main routine.

If the arbitrary distance-measuring point specified by the photographer is one other than 239 and 240 the flow will proceed from step #69 to step #71 to check this time whether the arbitrary distance-measuring point specified by the photographer is 241, 242 or 243. If so the flow will branch off to step #72 to set the arbitrary distance-measuring point to 242 and will leave this subroutine to return to the main routine.

If the arbitrary distance-measuring point specified by the photographer is one other than 241, 242 and 243 the flow will proceed from step #71 to step #73 to set the arbitrary distance-measuring point to 245 and will leave this subroutine to return to the main routine.

Returning to FIG. 10, in next step #33 it is determined whether the distance-measuring-point assignment switch is on; if it is off then the flow will proceed immediately to step #35. On the other hand, if it is on then the flow will proceed to step #34 to detect which point was selected as a distance-measuring point out of the distance-measuring points (45 points or 11 points) available for distance measurement by the photographer. This selection is carried out using an unrepresented up-down switch and left-right switch or the like to select one out of the 45 points or 11 points, as shown in FIGS. 8A, 8B and FIGS. 9A, 9B. The distance-measuring point selected in this step #34 is set as the arbitrary distance-measuring point to be subjected to the determination in #53, #55, #57, #59, #61, #63, #65, #67, #69, or #71 in FIG. 11 and FIG. 12.

In next step #35 the MPU 100 checks the status of the switch SW1, which becomes on by the first stroke of the shutter release button; if it is off the flow will return to step #31. If the switch SW1 is on then the flow will proceed to step #36 to check the status of the line-of-sight allowance switch this time; if it is off the flow will proceed immediately to step #38. If the line-of-sight allowance switch is on the flow will branch off to step #37 to carry out the detection of line of sight here to obtain the line of sight (point of fixation) by detecting the P images (the Purkinje images: corneal reflex images) and a position of the center of the pupillary circle and to set a distance-measuring point corresponding to the point of fixation. Then the flow will proceed to step #38. This distance-measuring point set in #37 is also set as the arbitrary distance-measuring point to be subjected to the determination in FIG. 11 and FIG. 12.

In step #38 one distance-measuring point is selected out of the distance-measuring point determined in above step #34 and the distance-measuring point available for distance measurement obtained from the line-of-sight information in above step #37 and the focus detection operation is carried out thereat. This focus detection is carried out by the known phase difference detecting method by the focus detection circuit 105 as described previously.

In next step #39 the MPU 100 controls the lens control circuit 112, based on the focus information obtained by the above focus detection operation, to perform the focus adjustment of lens. In subsequent step #40 an exposure dose is determined according to the luminance information of object from the photometry circuit 106. Then in step #41 the status of the switch SW2, which becomes on by the second stroke of the shutter release button, is checked; if it is off the flow will return to step #31.

On the other hand, if the switch SW2 is on then the flow will proceed from step #41 to step #42 to perform the following release control for exposure on the film. Specifically, the main mirror 2 is moved up prior to the exposure operation, so as to be retracted from the photographing optical path. Then the aperture 31 in the lens is driven through the lens control circuit 112 up to an aperture amount based on the exposure dose determined. Then the shutter is controlled by the shutter control circuit 107 so as to be open during a shutter open time (shutter speed) based on the exposure dose determined, thereby completing exposure. After that, the main mirror 2 retracted from the photographing optical path is moved down so as to be again obliquely set in the photographing optical path.

In next step #43 the MPU 100 starts feeding of film through the motor control circuit 108 in order to wind the film up by one frame and stops the feeding when receiving the film feed completion signal from the film feeding detection circuit 109. Then the flow returns to step #31.

According to the second embodiment described above, when the number of distance-measuring points for focus detection is decreased as in the distribution defined by the dotted lines of FIG. 7, the arbitrary distance-measuring point set by the photographer can be moved into the decreased number of distance-measuring points; therefore, even if the number of distance-measuring points is decreased, an object having been tracked before the decrease can be captured relatively easily.

Third embodiment

The single-lens reflex camera according to the third embodiment of the present invention will be described. The optical arrangement and electrical configuration of the camera are the same as in the first embodiment described above and, therefore, the details thereof are omitted herein.

The sequential operations of the single-lens reflex camera in this embodiment will be described using the flowcharts of FIG. 13 and FIG. 14.

Figure 13:
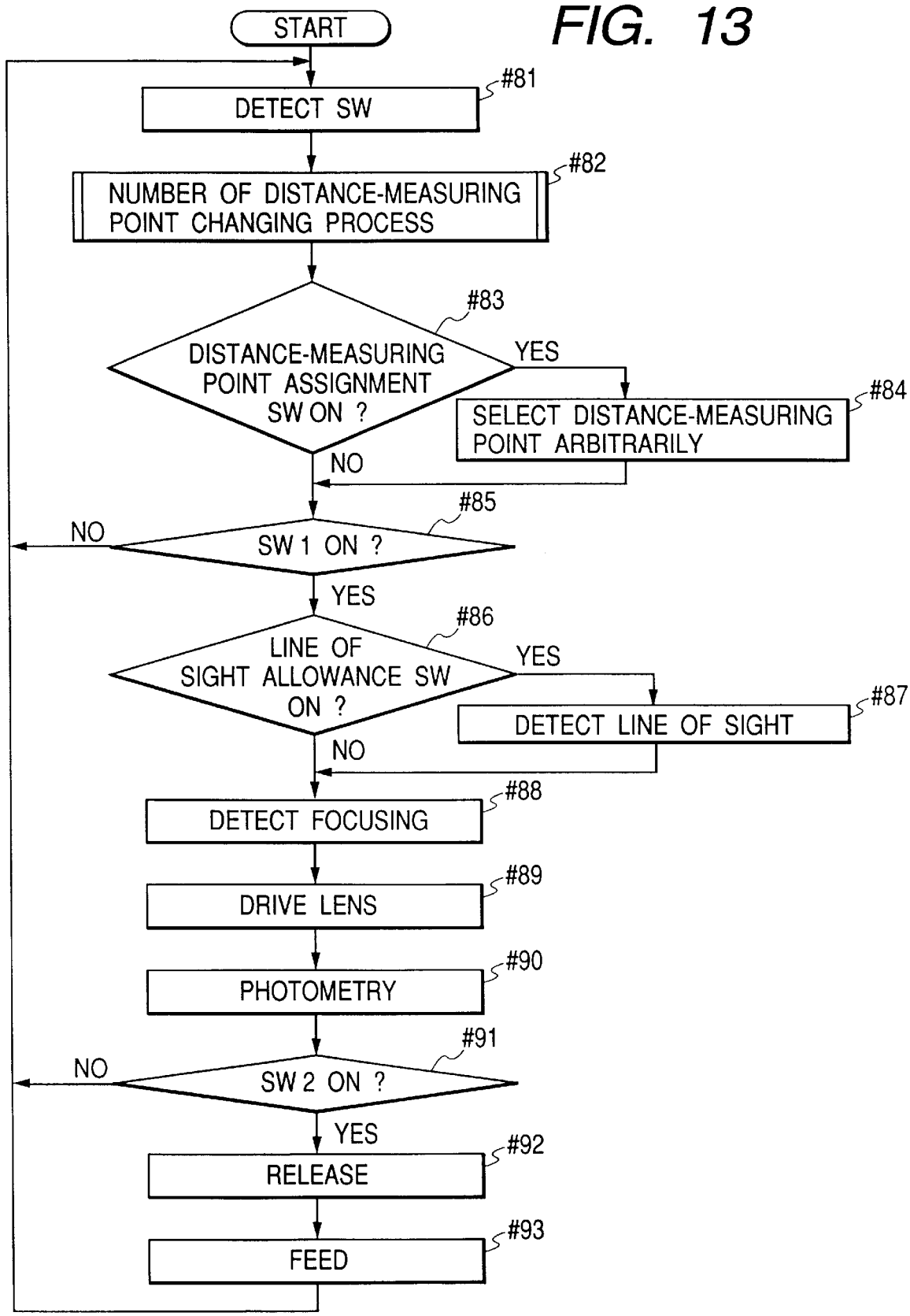
FIG. 13 is a flowchart to show a series of operations in a single-lens reflex camera according to the third embodiment of the present invention.
Figure 14:
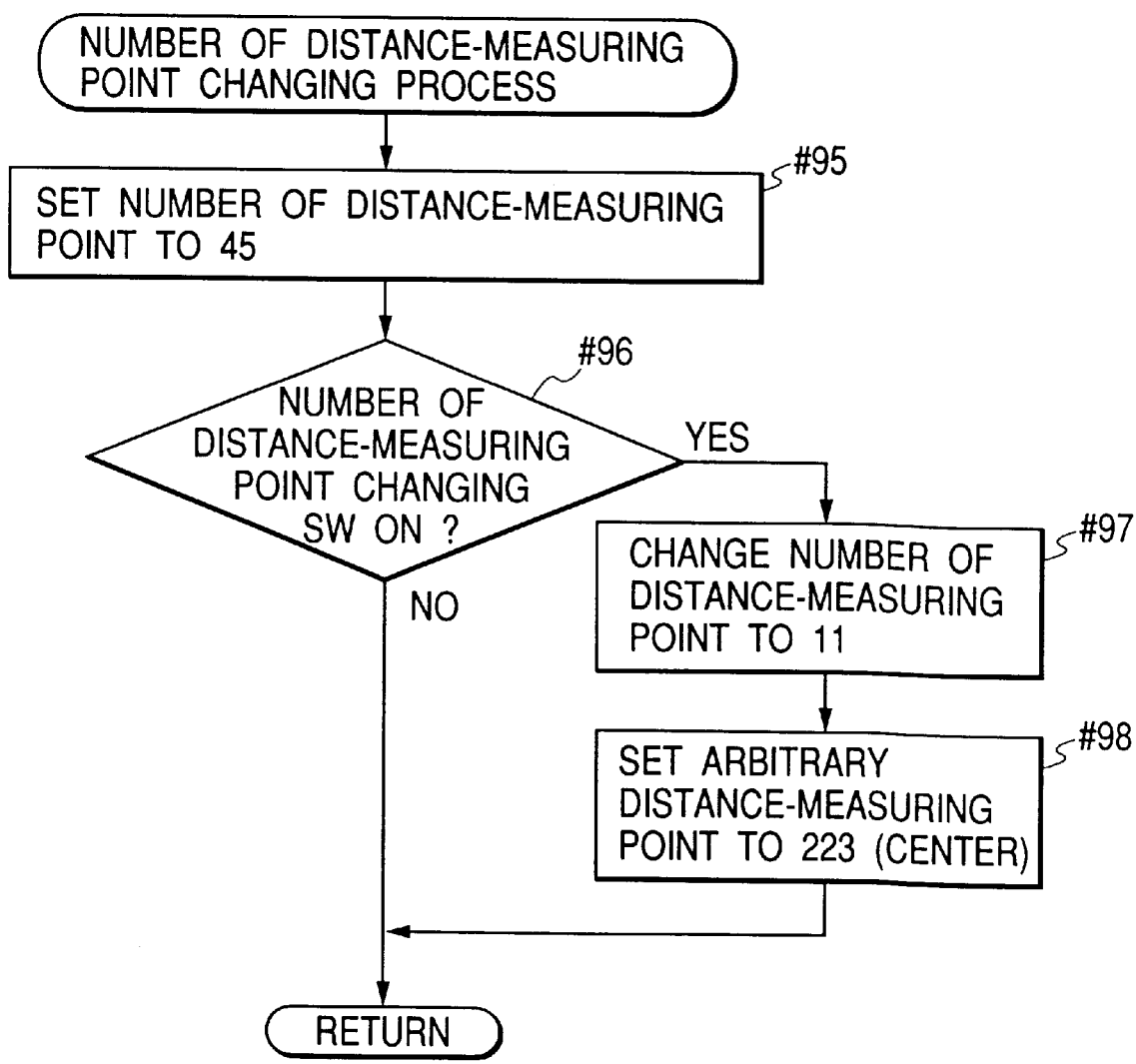
FIG. 14 is a flowchart to show some of operations in a changing process of number of distance-measuring points carried out in step #82 of FIG. 13.

In FIG. 13, when the operation of camera is started, the MPU 100 first carries out the switch detection in step #81 and then performs the subroutine of "number-of-distance-measuring-points changing process" in next step #82.

The "number-of-distance-measuring-points changing process," which is the subroutine executed in above step #82, will be described using the flowchart of FIG. 14.

In step #95 the number of distance-measuring points available for distance measurement is set to 45. Then, in next step #96, if the number-of-distance-measuring-points changing switch is off then the flow will leave this subroutine to return to the main routine. On the other hand, if the number-of-distance-measuring-points changing switch is on the flow will branch off to step #97 to change the number of distance-measuring points available for distance measurement to 11. Then, in next step #98, the arbitrary distance-measuring point specified by the photographer is forcedly set to 223 (the center distance-measuring point) and then the flow will leave the subroutine to return to the main routine.

Returning to FIG. 13, in next step #83 it is determined whether the distance-measuring-point assignment switch is on; if it is off then the flow will proceed immediately to step #85. On the other hand, if it is on then the flow will proceed to step #84 to detect which point was selected as a distance-measuring point out of the distance-measuring points (45 points or 11 points) available for distance measurement by the photographer. This selection is carried out using the unrepresented up-down switch and left-right switch or the like to select one out of the 45 points or 11 points, as shown above in FIGS. 8A, 8B and FIGS. 9A, 9B.

In next step #85 the MPU 100 checks the status of the switch SW1, which becomes on by the first stroke of the shutter release button; if it is off the flow will return to step

81. If the switch SW1 is on then the flow will proceed to step #86 to check the status of the line-of-sight allowance switch this time; if it is off the flow will proceed immediately to step #88. If the line-of-sight allowance switch is on the flow will branch off to step #87 to carry out the detection of line of sight here to obtain the line of sight (point of fixation) by detecting the P images (the Purkinje images: corneal reflex images) and a position of the center of the pupillary circle. Then the flow will proceed to step #88.

In step #88 one distance-measuring point is selected out of the distance-measuring point determined in above step #84 and the distance-measuring point available for distance measurement obtained from the line-of-sight information in above step #87 and the focus detection operation is carried out thereat. This focus detection is carried out by the known phase difference detecting method by the focus detection circuit 105 as described previously.

In next step #89 the MPU 100 controls the lens control circuit 112, based on the focus information obtained by the above focus detection operation, to perform the focus adjustment of lens. In subsequent step #90 an exposure dose is determined according to the luminance information of object from the photometry circuit 106. Then in step #91 the status of the switch SW2, which becomes on by the second stroke of the shutter release button, is checked; if it is off the flow will return to step #81.

On the other hand, if the switch SW2 is on then the flow will proceed from step #91 to step #92 to perform the following release control for exposure on the film. Specifically, the main mirror 2 is moved up prior to the exposure operation, so as to be retracted from the photographing optical path. Then the aperture 31 in the lens is driven through the lens control circuit 112 up to an aperture amount based on the exposure dose determined. Then the shutter is controlled by the shutter control circuit 107 so as to be open during a shutter open time (shutter speed) based on the exposure dose determined, thereby completing exposure. After that, the main mirror 2 retracted from the photographing optical path is moved down so as to be again obliquely set in the photographing optical path.

In next step #93 the MPU 100 starts feeding of film through the motor control circuit 108 in order to wind the film up by one frame and stops the feeding when receiving the film feed completion signal from the film feeding detection circuit 109. Then the flow returns to step #81. Step #98 described above is so arranged that if an arbitrary distance-measuring point is selected in #84 or #87 after this step is carried out once this step will not be executed until the number-of-distance-measuring-points changing switch is turned from off to on.

According to the third embodiment described above, when the number of distance-measuring points for focus detection is decreased, the arbitrary distance-measuring point set by the photographer can be moved to the center distance-measuring point in the distance-measuring range which is also within the decreased member of distance-measuring points; therefore, the next setting of the arbitrary distance-measuring point by the photographer is from the center distance-measuring point, and the device is thus easier to operate.

Modifications

Although each of the above embodiments was described with the example of camera having the focus detecting points, it should be noted that the present invention is also applicable to distance-measuring devices having distance-measuring points used for measuring the distance to the object, automatic focus adjusting apparatuses for adjusting the position of lens based on information from the distance-measuring device, and cameras provided with the automatic focus adjusting apparatus, and so on.

The present invention was described with the examples of application to the single-lens reflex camera, but the invention can also be applied to such cameras as lens shutter cameras, video cameras, or electronic still cameras. Further, the present invention can also be applied to telescopes, binoculars, other optical devices, and constitutive units thereof.

What is claimed is:

1. A camera comprising a focus detecting device for carrying out detection of focus for each area in a first number of plural focus detection areas, comprising:
   a focus detection area setting circuit having a first mode for setting said first number of plural areas as focus detection areas and a second mode for setting a second number of plural areas as focus detection areas by excluding predetermined areas out of the areas in the first mode; and
   a selection circuit for allowing an operator to arbitrarily select one of said first and second modes.

2. A camera according to claim 1, wherein said first number of plural areas are distributed so as to substantially evenly cover a predetermined range of a screen and said second number of areas are also distributed so as to substantially evenly cover said predetermined range.

3. A camera according to claim 1, said camera comprising assigning means arranged so that in said first mode said assigning means assigns an arbitrary area as a focus detection area out of said first number of areas and in said second mode said assigning means assigns an arbitrary area as a focus detection area out of said second number of areas.

4. A camera according to claim 3, said camera comprising an assignment control circuit arranged so that when in said first mode an arbitrary area is assigned and thereafter the mode is changed to the second mode and when the area assigned in said first mode is not set as an area in said second mode by the setting circuit, the assignment control circuit assigns an area close to said area assigned in said first mode out of the second number of areas set in the second mode, as a focus detection area.

5. A camera according to claim 3, said camera comprising an assignment control circuit arranged so that when in said first mode an arbitrary area is assigned and thereafter the mode is changed to the second mode and when the area assigned in said first mode is not set as an area in said second mode by the setting circuit, the assignment control circuit assigns a specific area preliminarily determined out of the second number of areas set in the second mode, as a focus detection area.

6. A camera according to claim 5, wherein said specific area is a center area.

7. A camera comprising a focus detecting device having a first number of plural focus detection areas arranged in a two-dimensional direction so as to substantially evenly cover a predetermined range of a screen and arranged to perform detection of focus for each area, comprising:
   a focus detection area setting circuit having a first mode for setting said first number of plural areas as focus detection areas and a second mode for setting a second number of plural areas as focus detection areas by excluding predetermined areas in the areas in the first mode; and
   a selection circuit for selection of said first and second modes.

8. A camera according to claim 7, said camera comprising assigning means arranged so that in said first mode said assigning means assigns an arbitrary area as a focus detection area out of said first number of areas and in said second mode said assigning means assigns an arbitrary area as a focus detection area out of said second number of areas.

9. A camera according to claim 8, said camera comprising an assignment control circuit arranged so that when in said first mode an arbitrary area is assigned and thereafter the mode is changed to the second mode and when the area assigned in said first mode is not set as an area in said second mode by the setting circuit, the assignment control circuit assigns an area close to said area assigned in said first mode out of the second number of areas set in the second mode, as a focus detection area.

10. A camera according to claim 8, said camera comprising an assignment control circuit arranged so that when in said first mode an arbitrary area is assigned and thereafter the mode is changed to the second mode and when the area assigned in said first mode is not set as an area in said second mode by the setting circuit, the assignment control circuit assigns a specific area preliminarily determined out of the second number of areas set in the second mode, as a focus detection area.

11. A camera comprising a focus detecting device for carrying out detection of focus for each area in a first number of plural focus detection areas, comprising:

a focus detection area setting circuit having a first mode for setting said first number of plural areas as focus detection areas and a second mode for setting a second number of plural areas as focus detection areas by excluding predetermined areas in the areas in the first mode;

a selection circuit for selecting one of said first and second modes;

assigning means arranged so that in said first mode said assigning means assigns an arbitrary area as a focus detection area out of said first number of areas and in said second mode said assigning means assigns an arbitrary area as a focus detection area out of said second number of areas; and an assignment control circuit arranged so that when in said first mode an arbitrary area is assigned and thereafter the mode is changed to the second mode and when the area assigned in said first mode is not set as an area in said second mode by the setting circuit, the assignment control circuit assigns an area close to said area assigned in said first mode out of the second number of areas set in the second mode, as a focus detection area.

12. A camera comprising a focus detecting device for carrying out detection of focus for each area in a first number of plural focus detection areas, comprising:

a focus detection area setting circuit having a first mode for setting said first number of plural areas as focus detection areas and a second mode for setting a second number of plural areas as focus detection areas by excluding predetermined areas in the areas in the first mode;

a selection circuit for selecting one of said first and second modes;

assigning means arranged so that in said first mode said assigning means assigns an arbitrary area as a focus detection area out of said first number of areas and in said second mode said assigning means assigns an arbitrary area as a focus detection area out of said second number of areas; and an assignment control circuit arranged so that when in said first mode an arbitrary area is assigned and thereafter the mode is changed to the second mode and when the area assigned in said first mode is not set as an area in said second mode by the setting circuit, the assignment control circuit assigns a specific area preliminarily determined out of the second number of areas set in the second mode, as a focus detection area.

* * * * *